United States Patent
Ning et al.

(10) Patent No.: US 11,889,374 B2
(45) Date of Patent: Jan. 30, 2024

(54) MOVING STATE REPORTING METHOD AND APPARATUS

(71) Applicant: Huawei Technologies Co., Ltd., Shenzhen (CN)

(72) Inventors: Jie Ning, Shanghai (CN); Jian Wang, Beijing (CN); Yifan Xue, Beijing (CN); Yiru Kuang, Beijing (CN); Bin Gu, Shanghai (CN); Lingxiao Lu, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 235 days.

(21) Appl. No.: 17/425,524

(22) PCT Filed: Jan. 20, 2020

(86) PCT No.: PCT/CN2020/073166
§ 371 (c)(1),
(2) Date: Jul. 23, 2021

(87) PCT Pub. No.: WO2020/151643
PCT Pub. Date: Jul. 30, 2020

(65) Prior Publication Data
US 2022/0095195 A1    Mar. 24, 2022

(30) Foreign Application Priority Data
Jan. 25, 2019 (CN) ................... 201910073231.8

(51) Int. Cl.
*H04W 36/00* (2009.01)
*H04W 36/32* (2009.01)
(Continued)

(52) U.S. Cl.
CPC .......... *H04W 36/32* (2013.01); *H04B 7/0695* (2013.01); *H04W 4/027* (2013.01);
(Continued)

(58) Field of Classification Search
CPC ..... H04W 36/32; H04W 36/06; H04W 4/027; H04W 4/40; H04W 8/24; H04W 64/006; H04B 7/0695
See application file for complete search history.

(56) References Cited

U.S. PATENT DOCUMENTS

| 2008/0171516 A1* | 7/2008 | Kakura .................. H04B 7/086 455/63.4 |
| 2010/0165914 A1* | 7/2010 | Cho ..................... H04B 7/0697 370/328 |

(Continued)

FOREIGN PATENT DOCUMENTS

| CN | 101542937 A | 9/2009 |
| CN | 104303428 A | 1/2015 |

(Continued)

OTHER PUBLICATIONS

3GPP TS 38.213 V15.4.0, "3rd Generation Partnership Project; Technical Specification Group Radio Access Network; NR; Physical layer procedures for control (Release 15)," Dec. 2018, 104 pages.

(Continued)

*Primary Examiner* — Khai M Nguyen
(74) *Attorney, Agent, or Firm* — Conley Rose, P.C.

(57) ABSTRACT

A moving state reporting method includes communicating, by a terminal, with a network device using a beam to carry a signal reporting, by the terminal, moving state information of the terminal to the network device, where the moving state information includes a speed flag, and the speed flag indicates that a speed of the terminal exceeds a speed threshold, and receiving, by the terminal, beam management information from the network device.

20 Claims, 4 Drawing Sheets

(51) Int. Cl.

| | | |
|---|---|---|
| *H04B 7/06* | (2006.01) | |
| *H04W 4/02* | (2018.01) | |
| *H04W 8/24* | (2009.01) | |
| *H04W 36/06* | (2009.01) | |
| *H04W 64/00* | (2009.01) | |
| *H04W 4/40* | (2018.01) | |

(52) U.S. Cl.
CPC ............ *H04W 8/24* (2013.01); *H04W 36/06* (2013.01); *H04W 64/006* (2013.01); *H04W 4/40* (2018.02)

(56) References Cited

U.S. PATENT DOCUMENTS

| | | | | |
|---|---|---|---|---|
| 2013/0229307 | A1* | 9/2013 | Chang | H01Q 25/00 |
| | | | | 342/372 |
| 2013/0343338 | A1 | 12/2013 | Campos et al. | |
| 2015/0104069 | A1* | 4/2015 | Li | H04W 4/024 |
| | | | | 382/103 |
| 2015/0111563 | A1* | 4/2015 | Zhao | H04W 8/22 |
| | | | | 455/418 |
| 2018/0159607 | A1* | 6/2018 | Rybakowski | H04B 7/0617 |
| 2021/0126690 | A1* | 4/2021 | Matsumura | H04B 7/0695 |
| 2021/0243660 | A1* | 8/2021 | Xie | H04W 36/0085 |

FOREIGN PATENT DOCUMENTS

| | | |
|---|---|---|
| CN | 104620551 A | 5/2015 |
| CN | 105814809 A | 7/2016 |
| CN | 106413018 A | 2/2017 |
| CN | 107534478 A | 1/2018 |
| CN | 108183738 A | 6/2018 |

OTHER PUBLICATIONS

3GPP TS 38.331 V15.4.0, "3rd Generation Partnership Project; Technical Specification Group Radio Access Network; NR;Radio Resource Control (RRC) protocol specification(Release 15)," Dec. 2018, 474 pages.

\* cited by examiner

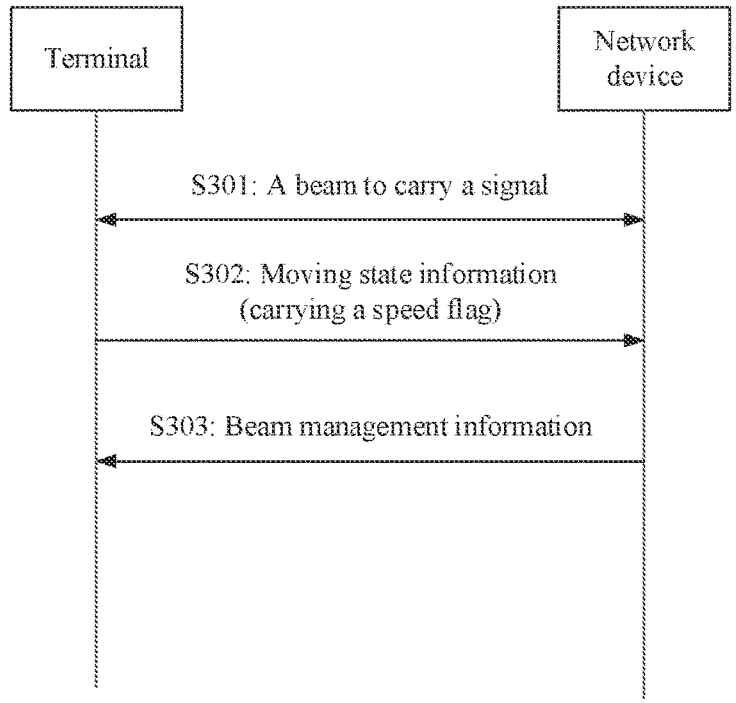

FIG. 3

| 0 | 1 | 2 | 3 | 4 | 5 | 6 | 7 |
|---|---|---|---|---|---|---|---|
| Speed flag | Example of a serving cell | Distance to a neighboring cell | Speed | Speed | Speed | Speed | Speed |
| Speed | Speed | Speed | Speed | Height | Height | Height | Height |
| Direction | Direction | Direction | Direction | Direction | Direction | Direction | Direction |
| ... | ... | ... | ... | ... | ... | ... | ... |
| Direction | Direction | Direction | Direction | Direction | Direction | Direction | Direction |
| Lat/log | Lat/log | Lat/log | Lat/log | Lat/log | Lat/log | Lat/log | Lat/log |
| .. | ... | ... | ... | ... | ... | ... | ... |
| Lat/log | Lat/log | Lat/log | Lat/log | Lat/log | Lat/log | Lat/log | Lat/log |

FIG. 4

MOVING STATE REPORTING METHOD AND APPARATUS

TECHNICAL FIELD

Cross-Reference to Related Applications

This is a U.S. National Stage of International Patent Application No. PCT/CN2020/073166 filed on Jan. 20, 2020, which claims priority to Chinese Patent Application No. 201910073231.8 filed on Jan. 25, 2019, both of which are hereby incorporated by reference in their entireties.

Background

As wireless communications technologies develop, requirements for communication quality are increasingly high. When a terminal moves at a low speed, for example, when a user with the terminal is in a walking state, a network device and the terminal can implement accurate signal transmission, and keep stable communication quality. However, when the terminal moves at a medium- and high-speed, a fluctuation is usually generated in signal coverage between the terminal and the network device, for example, a handover between cells, and for another example, switching between beams. When the terminal moves at the medium- and high-speed, various fluctuations in signal coverage result in scheduling difficulty of the network device, and even communication interruption and a communication failure.

When the communication fails, the terminal performs re-access. Medium- and high-speed moving undoubtedly causes frequent communication failures and frequent re-access. As a result, time and power are consumed, power resources of the terminal and the network device are wasted, data transmission performance is further affected, and therefore communication quality is greatly affected.

SUMMARY

Embodiments of this application provide a moving state reporting method and an apparatus, to resolve problems of frequent communication failures occurring on a terminal in a medium- and high-speed moving scenario.

Specific technical solutions provided in the embodiments of this application are as follows.

According to a first aspect, an embodiment of this application provides a moving state reporting method. The method may be performed by a terminal. The method is implemented in the following steps: The terminal communicates with a network device by using a beam to carry a signal. The terminal reports moving state information of the terminal to the network device. The moving state information of the terminal includes a speed flag. The speed flag is used to indicate that a speed of the terminal meets a preset condition. The terminal receives beam management information from the network device. The moving state information is reported to warn and avoid a beam failure in advance, reduce a communication interruption problem caused by frequent beam failure recovery, and help improve user experience. The moving state information is reported to help the network device schedule a wide beam or a plurality of beams for medium- and high-speed moving. This reduces power consumption caused by frequent beam failure detection and recovery occurring on the terminal in a medium- and high-speed movement scenario, and improves communication efficiency of the terminal. The moving state information is actively reported to improve scheduling accuracy of the network device, for example, avoiding scheduling a beam resource in an opposite direction of the moving, and improving 5G mobility.

With reference to the first aspect, in a first possible implementation of the first aspect, the terminal obtains the moving state information of the terminal by using a sensor. This helps improve accuracy of measuring a moving state and implement accurate measurement and reporting. The terminal further obtains the moving state information of the terminal by measuring a frequency offset by using a baseband processor. In this way, power consumption of measurement performed by the terminal can be reduced. Alternatively, the terminal obtains the moving state information of the terminal by using a sensor and by measuring a frequency offset by using a baseband processor.

With reference to the first possible implementation of the first aspect, in a second possible implementation of the first aspect, that the terminal obtains the moving state information of the terminal by measuring the frequency offset by using the baseband processor is implemented in the following manner: The terminal measures a moving state of the terminal by using the sensor and the baseband processor, and calibrates the baseband processor based on a first measurement result obtained by the sensor and a second measurement result obtained by the baseband processor. This can help improve accuracy of measuring the moving state information by the baseband processor.

With reference to any one of the first aspect, or the first to the second possible implementations of the first aspect, in a third possible implementation of the first aspect, that the terminal reports moving state information of the terminal to the network device is implemented in the following manner: The terminal reports the moving state information of the terminal to the network device by using any one of uplink control information, a media access layer control unit, or a radio resource control message. Different reporting manners can be applicable to different moving scenarios. This helps improve diversity and applicability of reporting the moving state information. The uplink control information is used to report the moving state information, to ensure timely reporting and a light payload. The media access layer control unit is used to report the moving state information, which is applicable to all scenarios and balances timeliness and a payload. The radio resource control message is used to report the moving state information, to ensure completeness of flexible information and optimize timeliness.

With reference to any one of the first aspect, or the first to the third possible implementations of the first aspect, in a fourth possible implementation of the first aspect, the preset condition includes: the speed of the terminal exceeds a speed threshold.

With reference to the fourth possible implementation of the first aspect, in a fifth possible implementation of the first aspect, that the terminal reports moving state information of the terminal to the network device is implemented in the following manners: The terminal reports the moving state information of the terminal to the network device when the speed of the terminal reaches the speed threshold, the terminal reports the moving state information of the terminal to the network device when the speed of the terminal reaches the speed threshold and duration reaches a specified first time threshold; or the terminal reports the moving state information of the terminal to the network device when an average speed of the terminal reaches the speed threshold in preset duration.

With reference to the fourth or the fifth possible implementation of the first aspect, in a sixth possible implementation of the first aspect, the speed threshold includes one or more threshold values. Therefore, different beam management solutions can be set based on different thresholds, so that the solutions are more flexible.

With reference to any one of the first aspect, or the first to the sixth possible implementations of the first aspect, in a seventh possible implementation of the first aspect, the terminal sends first capability information to the network device, where the first capability information is used to indicate that the terminal supports reporting of the moving state information of the terminal to the network device; and/or the terminal receives second capability information from the network device, and determines, based on the second capability information, that the network device supports receiving of the moving state information of the terminal reported by the terminal. Through capability negotiation, a current terminal that does not support the capability can be compatible.

With reference to the seventh possible implementation of the first aspect, in an eighth possible implementation of the first aspect, the second capability information is carried in a system message.

With reference to the seventh possible implementation of the first aspect, in a ninth possible implementation of the first aspect, the first capability information is carried in an uplink RRC message.

With reference to any one of the first aspect, or the first to the ninth possible implementations of the first aspect, in a tenth possible implementation of the first aspect, the preset condition further includes: the speed of the terminal is lower than a low-speed threshold.

With reference to any one of the first aspect or the first to the tenth possible implementations of the first aspect, in an eleventh possible implementation of the first aspect, the method further includes: The terminal reports indication information to the network device when the moving speed of the terminal is lower than the low-speed threshold. The indication information is used to indicate that the speed of the terminal is lower than the low-speed threshold. Alternatively, the terminal reports the indication information to the network device when the moving speed of the terminal is lower than the low-speed threshold and duration reaches a specified second time threshold. The low-speed threshold is the speed threshold, or the low-speed threshold is the lowest value in the speed thresholds. A solution of exiting reporting is proposed, to avoid power consumption caused by continuous reporting, and save electric energy.

With reference to the eleventh possible implementation of the first aspect, in a twelfth possible implementation of the first aspect, the indication information includes a high-speed flag. The high-speed flag is a second value.

With reference to the twelfth possible implementation of the first aspect, in a thirteenth possible implementation of the first aspect, that a terminal communicates with a network device by using a beam to carry a signal is implemented in the following manner: The terminal communicates with the network device by using a precise narrow beam to carry the signal when determining that the moving speed of the terminal is lower than the low-speed threshold. This can avoid the power consumption caused by continuous reporting, and save the electric energy.

With reference to any one of the first aspect, or the first to the thirteenth possible implementations of the first aspect, in a fourteenth possible implementation of the first aspect, the moving state information of the terminal further includes one or a combination of a plurality of the following parameters: information about a change of a location of the terminal relative to a serving cell, information about a change of a location of the terminal relative to a neighboring cell, the moving speed of the terminal, an altitude of the terminal, a moving direction of the terminal, or longitude and latitude of a location of the terminal.

With reference to the first aspect, in a fifteenth possible implementation of the first aspect, the high-speed flag is a first value.

With reference to any one of the first aspect, or the first to the fifteenth possible implementations of the first aspect, in a sixteenth possible implementation of the first aspect, the beam management information is any one or a combination of the following: information indicating to change a precise narrow beam into a wide beam, or change a precise narrow beam into a plurality of beams from a plurality of network devices; information about measurement reporting, reselection, and a handover threshold dedicated in a medium- and high-speed scenario; and information about a medium- and high-speed dedicated frequency or time resource.

According to a second aspect, a moving state reporting method is provided. The method is applicable to a terminal. The method is implemented in the following steps: The terminal communicates with a network device by using a beam to carry a signal. The terminal periodically reports moving state information of the terminal to the network device. The network device receives the moving state information periodically reported by the terminal. The terminal receives beam management information from the network device. The moving state information is reported to warn and avoid a beam failure in advance, reduce a communication interruption problem caused by frequent beam failure recovery, and help improve user experience. The moving state information is reported to help the network device schedule a wide beam or a plurality of beams for medium- and high-speed moving. This reduces power consumption caused by frequent beam failure detection and recovery occurring on the terminal in a medium- and high-speed movement scenario, and improves communication efficiency of the terminal. The moving state information is actively reported to improve scheduling accuracy of the network device, for example, avoiding scheduling a beam resource in an opposite direction of the moving, and improving 5G mobility.

With reference to the second aspect, in a first possible implementation of the second aspect, the moving state information of the terminal further includes one or a combination of a plurality of the following parameters: information about a change of a location of the terminal relative to a serving cell, information about a change of a location of the terminal relative to a neighboring cell, a moving speed of the terminal, an altitude of the terminal, a moving direction of the terminal, or longitude and latitude of a location of the terminal.

With reference to the second aspect, or the first possible implementation of the second aspect, in a second possible implementation of the second aspect, the terminal sends third capability information to the network device, where the third capability information is used to indicate that the terminal supports periodically reporting of the moving state information of the terminal to the network device; and/or the terminal receives fourth capability information from the network device, and determines, based on the fourth capability information, that the network device supports receiving of the moving state information of the terminal periodically reported by the terminal. Through capability negotiation, a current terminal that does not support the capability can be compatible.

According to a third aspect, a moving state reporting apparatus is provided. The apparatus may be used in a terminal or the apparatus is a terminal. The apparatus includes a processing unit, a sending unit, and a receiving unit. The processing unit is configured to communicate with a network device by using a beam to carry a signal. The sending unit is configured to report moving state information of the terminal to the network device. The moving state information of the terminal includes a speed flag. The speed flag is used to indicate that a speed of the terminal meets a preset condition. The receiving unit is configured to receive beam management information from the network device. The moving state information is reported to warn and avoid a beam failure in advance, reduce a communication interruption problem caused by frequent beam failure recovery, and help improve user experience. The moving state information is reported to help the network device schedule a wide beam or a plurality of beams for medium- and high-speed moving. This reduces power consumption caused by frequent beam failure detection and recovery occurring on the terminal in a medium- and high-speed movement scenario, and improves communication efficiency of the terminal. The moving state information is actively reported to improve scheduling accuracy of the network device, for example, avoiding scheduling a beam resource in an opposite direction of the moving, and improving 5G mobility.

With reference to the third aspect, in a first possible implementation of the third aspect, the processing unit is configured to obtain the moving state information of the terminal by using a sensor. This helps improve accuracy of measuring a moving state, and implement accurate measurement and reporting.

With reference to the third aspect or the first possible implementation of the third aspect, in a second possible implementation of the third aspect, the processing unit is configured to obtain the moving state information of the terminal by measuring a frequency offset by using a baseband processor. In this way, power consumption of measurement performed by the terminal can be reduced.

With reference to the first possible implementation of the third aspect or the second possible implementation of the third aspect, in a third possible implementation of the third aspect, the sensor and the baseband processor are used to measure a moving state of the terminal; and the baseband processor is calibrated based on a first measurement result obtained by the sensor and a second measurement result obtained by the baseband processor. This can help improve accuracy of measuring the moving state information by the baseband processor.

With reference to any one of the third aspect, or the first to the third possible implementations of the third aspect, in a fourth possible implementation of the third aspect, the sending unit is configured to report the moving state information of the terminal to the network device by using any one of uplink control information, a media access layer control unit, or a radio resource control message. Different reporting manners can be applicable to different moving scenarios. This helps improve diversity and applicability of reporting the moving state information. The uplink control information is used to report the moving state information, to ensure timely reporting and a light payload. The media access layer control unit is used to report the moving state information, which is applicable to all scenarios and balances timeliness and a payload. The radio resource control message is used to report the moving state information, to ensure completeness of flexible information and optimize timeliness.

With reference to any one of the third aspect, or the first to the fourth possible implementations of the third aspect, in a fifth possible implementation of the third aspect, the preset condition includes: the speed of the terminal exceeds a speed threshold.

With reference to any one of the third aspect, or the first to the fifth possible implementations of the third aspect, in a sixth possible implementation of the third aspect, the sending unit is configured to: report the moving state information of the terminal to the network device when the speed of the terminal reaches the speed threshold; report the moving state information of the terminal to the network device when the speed of the terminal reaches the speed threshold and duration reaches a specified first time threshold; or report the moving state information of the terminal to the network device when an average speed of the terminal reaches the speed threshold in preset duration.

With reference to any one of the third aspect, or the first to the sixth possible implementations of the third aspect, in a seventh possible implementation of the third aspect, the sending unit is further configured to send first capability information to the network device. The first capability information is used to indicate that the terminal supports reporting of the moving state information of the terminal to the network device. The receiving unit is further configured to receive second capability information from the network device, and determine, based on the second capability information, that the network device supports receiving of the moving state information of the terminal reported by the terminal. Through capability negotiation, a current terminal that does not support the capability can be compatible.

With reference to any one of the third aspect, or the first to the seventh possible implementations of the third aspect, in an eighth possible implementation of the third aspect, the preset condition further includes: the speed of the terminal is lower than a low-speed threshold.

With reference to any one of the third aspect, or the first to the eighth possible implementations of the third aspect, in a ninth possible implementation of the third aspect, the sending unit is further configured to: report, indication information to the network device when the moving speed is lower than the low-speed threshold, where the indication information is used to indicate that the speed of the terminal is lower than the low-speed threshold; report the indication information to the network device when the moving speed is lower than the low-speed threshold and duration reaches a specified second time threshold; or report the moving state information of the terminal to the network device when an average speed of the terminal is lower than the speed threshold in preset duration, where the low-speed threshold is the speed threshold, or the low-speed threshold is the lowest value in the speed thresholds. A solution of exiting reporting is proposed, to avoid power consumption caused by continuous reporting, and save electric energy.

With reference to any one of the third aspect or the first to the ninth possible implementations of the third aspect, in a tenth possible implementation of the third aspect, the processing unit is further configured to communicate with the network device by using a precise narrow beam to carry the signal when it is determined that the moving speed of the terminal is lower than the low-speed threshold. This can avoid the power consumption caused by continuous reporting, and save the electric energy.

With reference to any one of the third aspect, or the first to the tenth possible implementations of the third aspect, in an eleventh possible implementation of the third aspect, the beam management information is any one or a combination of the following: information indicating to change a precise narrow beam into a wide beam, or change a precise narrow beam into a plurality of beams from a plurality of network devices; information about measurement reporting, reselection, and a handover threshold dedicated in a medium- and high-speed scenario; and information about a medium- and high-speed dedicated frequency or time resource.

According to a fourth aspect, a moving state reporting apparatus is provided. The apparatus may be used in a terminal or the apparatus is a terminal. The apparatus includes a processing unit, a sending unit, and a receiving unit. The processing unit is configured to communicate with a network device by using a beam to carry a signal. The sending unit is configured to periodically report moving state information of the terminal to the network device. The receiving unit is configured to receive beam management information from the network device. The moving state information is reported to warn and avoid a beam failure in advance, reduce a communication interruption problem caused by frequent beam failure recovery, and help improve user experience. The moving state information is reported to help the network device schedule a wide beam or a plurality of beams for medium- and high-speed moving. This reduces power consumption caused by frequent beam failure detection and recovery occurring on the terminal in a medium- and high-speed movement scenario, and improves communication efficiency of the terminal. The moving state information is actively reported to improve scheduling accuracy of the network device, for example, avoiding scheduling a beam resource in an opposite direction of the moving, and improving 5G mobility.

With reference to the fourth aspect, in a first possible implementation of the fourth aspect, the moving state information of the terminal further includes one or a combination of a plurality of the following parameters: information about a change of a location of the terminal relative to a serving cell, information about a change of a location of the terminal relative to a neighboring cell, a moving speed of the terminal, an altitude of the terminal, a moving direction of the terminal, or longitude and latitude of a location of the terminal.

With reference to the fourth aspect, or the first possible implementation of the fourth aspect, in a second possible implementation of the fourth aspect, the sending unit is further configured to send third capability information to the network device, where the third capability information is used to indicate that the terminal supports periodically reporting of the moving state information of the terminal to the network device; and/or the receiving unit is further configured to receive fourth capability information from the network device, and determine, based on the fourth capability information, that the network device supports receiving of the moving state information of the terminal periodically reported by the terminal. Through capability negotiation, a current terminal that does not support the capability can be compatible.

According to a fifth aspect, a moving state reporting apparatus is provided. The apparatus may be used in a terminal or the apparatus is a terminal. The apparatus includes a transceiver and a processor. The processor is configured to: be coupled to a memory, invoke a program in the memory, and execute the program to perform the following steps: communicating with a network device by using a beam to carry a signal. The transceiver is configured to report moving state information of the terminal to the network device. The moving state information of the terminal includes a speed flag, and the speed flag is used to indicate that a speed of the terminal meets a preset condition. The transceiver is configured to receive beam management information from the network device. The moving state information is reported to warn and avoid a beam failure in advance, reduce a communication interruption problem caused by frequent beam failure recovery; and help improve user experience. The moving state information is reported to help the network device schedule a wide beam or a plurality of beams for medium- and high-speed moving. This reduces power consumption caused by frequent beam failure detection and recovery occurring on the terminal in a medium- and high-speed movement scenario, and improves communication efficiency of the terminal. The moving state information is actively reported to improve scheduling accuracy of the network device, for example, avoiding scheduling a beam resource in an opposite direction of the moving, and improving 5G mobility.

With reference to the fifth aspect, in a first possible implementation of the fifth aspect, the apparatus further includes a sensor. The sensor is configured to obtain the moving state information of the terminal. This helps improve accuracy of measuring a moving state, and implement accurate measurement and reporting.

With reference to the fifth aspect or the first possible implementation of the fifth aspect, in a second possible implementation of the fifth aspect, the apparatus further includes an automatic frequency control AFC module. The AFC module is configured to obtain the moving state information of the terminal by measuring a frequency offset, in this way, power consumption of measurement performed by the terminal can be reduced.

With reference to the first possible implementation of the fifth aspect or the second possible implementation of the fifth aspect, in a third possible implementation of the fifth aspect, the processor is further configured to: calibrate the baseband processor based on a first measurement result obtained by the sensor and a second measurement result obtained by the AFC module. This can help improve accuracy of measuring the moving state information by the baseband processor.

With reference to any one of the fifth aspect, or the first to the third possible implementations of the fifth aspect, in a fourth possible implementation of the fifth aspect, the transceiver is configured to: report the moving state information of the terminal to the network device by using any one of uplink control information, a media access layer control unit, or a radio resource control message. Different reporting manners can be applicable to different moving scenarios. This helps improve diversity and applicability of reporting the moving state information. The uplink control information is used to report the moving state information, to ensure timely reporting and a light payload. The media access layer control unit is used to report the moving state information, which is applicable to all scenarios and balances timeliness and a payload. The radio resource control message is used to report the moving state information, to ensure completeness of flexible information and optimize timeliness.

With reference to any one of the fifth aspect, or the first to the fourth possible implementations of the fifth aspect, in a fifth possible implementation of the fifth aspect, the preset condition includes: the speed of the terminal exceeds a speed threshold.

With reference to any one of the fifth aspect, or the first to the fifth possible implementations of the fifth aspect, in a sixth possible implementation of the fifth aspect, the transceiver is configured to: report the moving state information of the terminal to the network device when the speed of the terminal reaches the speed threshold; report the moving state information of the terminal to the network device when the speed of the terminal reaches the speed threshold and duration reaches a specified first time threshold; or report the moving state information of the terminal to the network device when an average speed of the terminal reaches the speed threshold in preset duration.

With reference to any one of the fifth aspect, or the first to the sixth possible implementations of the fifth aspect, in a seventh possible implementation of the fifth aspect, the transceiver is further configured to send first capability information to the network device. The first capability information is used to indicate that the terminal supports reporting of the moving state information of the terminal to the network device. The transceiver is further configured to receive second capability information from the network device, and determine, based on the second capability information, that the network device supports receiving of the moving state information of the terminal reported by the terminal. Through capability negotiation, a current terminal that does not support the capability can be compatible.

With reference to any one of the fifth aspect, or the first to the seventh possible implementations of the fifth aspect, in an eighth possible implementation of the fifth aspect, the preset condition further includes: the speed of the terminal is lower than a low-speed threshold.

With reference to the eighth possible implementation of the fifth aspect, in a ninth possible implementation of the fifth aspect, the transceiver is further configured to: report indication information to the network device when the moving speed of the terminal is lower than the low-speed threshold, where the indication information is used to indicate that the speed of the terminal is lower than the low-speed threshold; report the indication information to the network device when the moving speed of the terminal is lower than the low-speed threshold and duration reaches a specified second time threshold; or report the moving state information of the terminal to the network device when an average speed of the terminal is lower than the speed threshold in preset duration, where the low-speed threshold is the speed threshold, or the low-speed threshold is the lowest value in the speed thresholds. A solution of exiting reporting is proposed, to avoid power consumption caused by continuous reporting, and save electric energy.

With reference to the ninth possible implementation of the fifth aspect, in a tenth possible implementation of the fifth aspect, the processor is further configured to communicate with the network device by using a precise narrow beam to carry the signal when it is determined that the moving speed of the terminal is lower than the low-speed threshold. This can avoid the power consumption caused by continuous reporting, and save the electric energy.

With reference to the tenth possible implementation of the fifth aspect, in an eleventh possible implementation of the fifth aspect, the beam management information is any one or a combination of the following: information indicating to change a precise narrow beam into a wide beam, or change a precise narrow beam into a plurality of beams from a plurality of network devices; information about measurement reporting, reselection, and a handover threshold dedicated in a medium- and high-speed scenario; and information about a medium- and high-speed dedicated frequency or time resource.

According to a sixth aspect, a moving state reporting apparatus is provided. The apparatus may be used in a terminal or the apparatus is a terminal. The apparatus includes a processor and a transceiver. The processor is configured to: be coupled to a memory, invoke a program in the memory, and execute the program to implement the following steps: communicating with a network device by using a beam to carry a signal. The transceiver is configured to periodically report moving state information of the terminal to the network device. The transceiver is configured to receive beam management information from the network device. The moving state information is reported to warn and avoid a beam failure in advance, reduce a communication interruption problem caused by frequent beam failure recovery, and help improve user experience. The moving state information is reported to help the network device schedule a wide beam or a plurality of beams for medium- and high-speed moving. This reduces power consumption caused by frequent beam failure detection and recovery occurring on the terminal in a medium- and high-speed movement scenario, and improves communication efficiency of the terminal. The moving state information is actively reported to improve scheduling accuracy of the network device, for example, avoiding scheduling a beam resource in an opposite direction of the moving, and improving 5G mobility.

With reference to the sixth aspect, in a first possible implementation of the sixth aspect, the moving state information of the terminal further includes one or a combination of a plurality of the following parameters: information about a change of a location of the terminal relative to a serving cell, information about a change of a location of the terminal relative to a neighboring cell, a moving speed of the terminal, an altitude of the terminal, a moving direction of the terminal, or longitude and latitude of a location of the terminal.

With reference to the sixth aspect, or the first possible implementation of the sixth aspect, in a second possible implementation of the sixth aspect, the transceiver is further configured to send third capability information to the network device, where the third capability information is used to indicate that the terminal supports periodically reporting of the moving state information of the terminal to the network device; and/or the transceiver is further configured to receive fourth capability information from the network device, and determine, based on the fourth capability information, that the network device supports receiving of the moving state information of the terminal periodically reported by the terminal. Through capability negotiation, a current terminal that does not support the capability can be compatible.

According to a seventh aspect, a chip is provided. The chip is connected to a memory or the chip includes a memory, and is configured to read and execute a software program stored in the memory, to implement the method according to any one of the first aspect, the second aspect, the possible implementations of the first aspect, and the possible implementations of the second aspect.

According to an eighth aspect, a communications system is provided. The communications system includes a terminal and a network device. The terminal is configured to perform the method according to any one of the first aspect, the second aspect, the possible implementations of the first aspect, and the possible implementations of the second aspect.

According to a ninth aspect, a computer storage medium is provided. The computer storage medium stores computer programs, and the computer programs include instructions used to perform the method in any one of the foregoing aspects and the possible designs of the foregoing aspects.

According to a tenth aspect, a computer program product is provided. When a computer reads and executes the computer program product, the computer is enabled to perform the method in any one of the foregoing aspects and the possible designs of the foregoing aspects.

BRIEF DESCRIPTION OF DRAWINGS

FIG. 3 is a schematic flowchart of a moving state reporting method according to an embodiment of this application;

FIG. 4 is a schematic diagram of carrying moving state information in a MAC CE according to an embodiment of this application;

DESCRIPTION OF THE EMBODIMENTS

Embodiments of this application provide a moving state reporting method and an apparatus, to report moving state information of a terminal to a network device in a timely manner. Therefore, the network device can use an appropriate communication manner in a timely manner, to avoid problems of frequent communication failures occurring on the terminal in a medium- and high-speed moving scenario. The method and the apparatus are based on a same concept. Because principles for resolving the problems by using the method and the apparatus are similar, mutual reference may be made between implementations of the apparatus and the method. No repeated description is provided. In descriptions of the embodiments of this application, the term "and/or" describes an association relationship between associated objects and represents that three relationships may exist. For example, A and/or B may represent the following three cases: Only A exists, both A and B exist, and only B exists. The character "/" generally indicates an "or" relationship between the associated objects. In this application, "at least one" means one or more, and "a plurality of" means two or more. In addition, it should be understood that in the descriptions of this application, terms such as "first" and "second" are merely used for distinguishing and description, but should not be understood as indicating or implying relative importance, or should not be understood as indicating or implying a sequence.

A signal processing method provided in the embodiments of this application may be applicable to a 4th generation (4th generation, 4G) communications system, a 5th generation (5th generation, 5G) new radio (new radio, NR) communications system, or various future communications systems.

Figure 1:
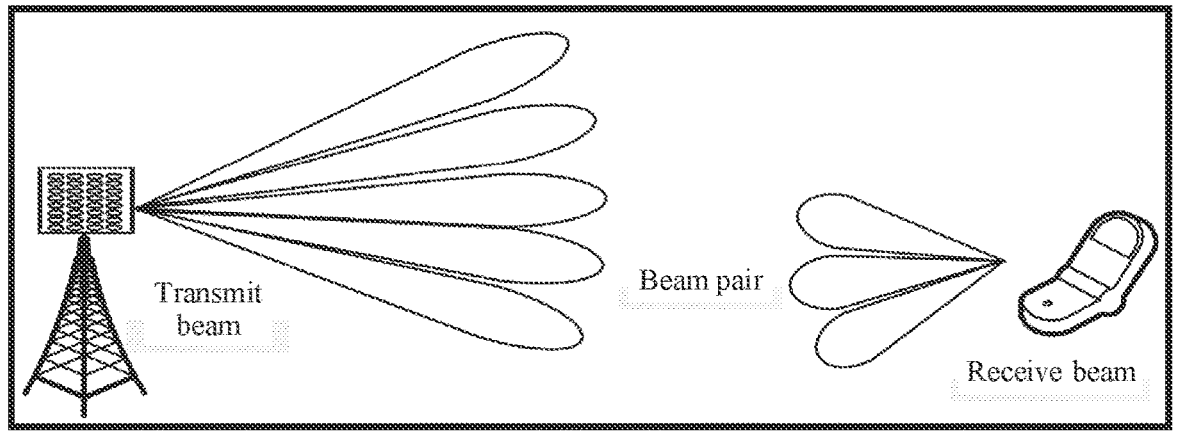
FIG. 1 is a schematic diagram of beamforming in an NR system in a conventional technology.

A 5G NR communications system is used as an example. In the 5G NR communications system, as shown in FIG. 1, an antenna array is mainly used to perform beamforming on a signal, so that a precise narrow beam provides a service for user data Beamforming can be used to obtain a longer coverage distance and reduce interference. A downlink direction is used as an example. A transmit beam of a network device and a receive beam of a terminal form a beam pair. The beam pair is used to implement strong signal transmission. However, in a medium- and high-speed moving scenario, because a beam is comparatively narrow and a coverage area is small, an uplink beam and a downlink beam are easily misplaced in a movement process of the terminal. When the terminal deviates from a direction of the beam pair, the signal becomes weak or even is disconnected, and a beam failure occurs.

In a conventional technology, the terminal detects the beam failure. When detecting that a quantity of times that quality or strength of a signal carried on a beam is lower than an out-of-synchronization threshold reaches a specified quantity threshold, the terminal reports the beam failure. The precise narrow beam is generally only 200 m within a millimeter wave (mmw) coverage range. When moving at a high speed, the terminal reports the beam failure every 2 ms in a worst case. Therefore, beam recovery is performed between the network device and the terminal. The beam recovery includes two sub-phases. In a first sub-phase, contention-free random access is used to recover the beam. Before a beam failure recovery timer expires, the terminal needs to complete the beam recovery through the contention-free random access reserved by the network device. Once the beam failure recovery timer expires and the beam recovery is not completed, a second sub-phase is entered. In the second sub-phase, after the beam failure recovery timer expires, the terminal needs to notify an upper layer that the beam recovery fails, and continues to attempt to recover the beam through contention-based random access.

However, in the medium- and high-speed moving scenario of the terminal, frequent beam failures occur, and frequent beam failure detection and frequent beam failure recovery are caused. As a result, time and power are consumed, power resources of the terminal and the network device are wasted, and therefore data transmission performance is further affected.

According to the moving state reporting method and the apparatus that are designed in the embodiments of this application, the moving state information of the terminal is reported to the network device in a timely manner. Therefore, the network device can use the appropriate beam management manner in a timely manner, to avoid the problems of frequent beam failures occurring on the terminal in the medium- and high-speed moving scenario.

In the following descriptions of the embodiments of this application, a beam communication scenario in a 5G NR system is mainly used as an example. It should be understood that the method for reporting a moving state by the terminal in the embodiments of this application may be applicable to a 4G communications system or another communications system for non-beam communication. When the method is applicable to the communications system for non-beam communication, a terminal and a network device communicate with each other through a common radio link. The moving state reporting method provided in the embodiments of this application may be used to replace, with a description related to the common radio link, a beam to carry a signal and a description related to the beam, which both fall within the protection scope of this application.

The following describes in detail the embodiments of this application with reference to accompanying drawings.

Figure 2:
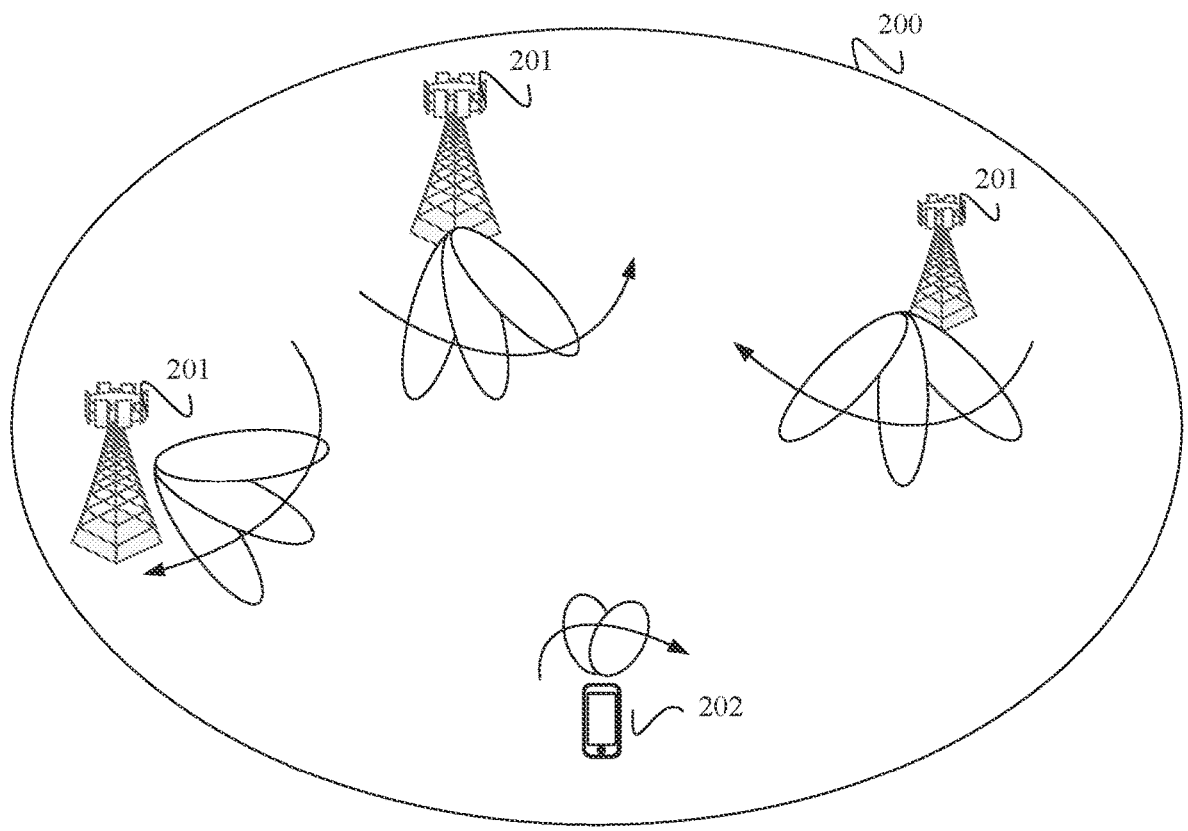
FIG. 2 is a schematic diagram of a system architecture according to an embodiment of this application.

FIG. 2 shows an architecture of a possible communications system to which a moving state reporting method is applicable according to an embodiment of this application. A 5G NR system is used as an example. As shown in FIG. 2, in the 5G NR system, an antenna array is mainly used to perform beamforming on a signal, so that a precise narrow beam provides a service for user data. The communications system 200 includes a network device 201 and a terminal 202.

The network device 201 is a node in a radio access network (radio access network, RAN), and may also be referred to as a base station, or may be referred to as a RAN node (or a device). Currently, some examples of the network device 101 are a general NodeB (general node B, gNB), a new radio NodeB (new radio node B, NR-NB), a transmission reception point (transmission reception point, TRP), an evolved NodeB (evolved Node B, eNB), a radio network controller (radio network controller, RNC), a NodeB (Node B, NB), a base station controller (base station controller, BSC), a base transceiver station (base transceiver station, BTS), a home base station (for example, a home evolved NodeB, HeNB, or a home Node B, HNB), a baseband unit (base band unit, BBU), a wireless fidelity (wireless fidelity, Wi-Fi) access point (access point, AP), a network side device in a 5G communications system or a possible future communications system, or the like.

The terminal 202 is also referred to as user equipment (user equipment, UE), a mobile station (mobile station, MS), a mobile terminal (mobile terminal, MT), or the like, and is a device that provides voice or data connectivity for a user, or may be an internee of things device. For example, the terminal 102 includes a handheld device or a vehicle-mounted device that has a wireless connection function. Currently, the terminal 202 may be a mobile phone (mobile phone), a tablet, a notebook computer, a palmtop computer, a mobile interact device (mobile interne device, MID), a wearable device (for example, a smartwatch, a smart hand, or a pedometer), a vehicle-mounted device (for example, an automobile, a bicycle, an electric vehicle, an aircraft, a ship, a train, or a high-speed train), a virtual reality (virtual reality, VR) device, an augmented reality (augmented reality, AR) device, a wireless terminal in industrial control (industrial control), a smart home device (for example, a refrigerator, a television, an air conditioner, or an electricity meter), an intelligent robot, a workshop device, a wireless terminal in self driving (self driving), a wireless terminal ifs remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a flight device (for example, an intelligent robot, a hot balloon, an unmanned aerial vehicle, or an aircraft), or the like.

Compared with long term evolution (long term evolution, LTE), a 5G communications system uses a higher carrier frequency (generally, greater than 6 GHz), for example, a 28 GHz, 38 GHz, or 72 GHz frequency band, to implement wireless communication with a larger bandwidth and a higher transmission rate. Because of a comparatively high carrier frequency, a radio signal transmitted at the carrier frequency undergoes more severe fading in a space propagation process, and even it is difficult for a receiving end to detect the radio signal. Therefore, in the 5G communications system, a beamforming (beamforming, BF) technology is used to obtain a beam with good directionality, to increase power in a transmit direction and improve a signal to interference plus noise ratio (signal to interference plus noise ratio, SINR) of the receiving end. To increase a coverage area and control costs of the antenna array, a hybrid beamforming (hybrid beamforming, HBF) technology becomes a best choice, and includes both analog beamforming (analogy beamforming, ABF) and digital beamforming (digital beamforming, DBF). The DBF is similar to multi-input multi-output (multi-input multi-output, MIMO) in the LTE. The ABF changes weights between array elements in the antenna array to adjust a direction of an analog beam. To further improve communication quality, the beamforming technology is also used on the terminal to generate analog beams in different directions, so as to receive and send data. Because both the network device 201 and the terminal 202 perform communication by using a comparatively narrow analog beam, better communication quality is obtained only when an analog beam used for sending and an analog beam used for receiving are aligned. Therefore, in the 3GPP RAN1 meeting, it is determined that a beam sweeping (beam sweeping) process is used in 5G NR to determine a beam pair (a transmit beam and a receive beam) between the network device and the terminal, as shown in FIG. 2. In addition, a plurality of beam pairs are monitored in a communication process, to improve robustness of a communication link. In addition, to improve a cell (cell) coverage capability, one cell in the 5G NR may include a plurality of TRPS, and each TRP may transmit a plurality of different analog beams.

Based on the description of the system architecture, the following specifically describes the moving state reporting method provided in the embodiments of this application. As shown in FIG. 3, a specific process of a moving state reporting method provided in an embodiment of this application is described as follows.

S301: A terminal communicates with a network device by using a beam to carry a signal.

The terminal uses a beam to carry an uplink signal or uplink data, and the network device samples a beam to carry a downlink signal and downlink data.

S302: The terminal reports moving state information of the terminal to the network device, and the network device receives the moving state information of the terminal reported by the terminal.

The moving state information of the terminal includes a speed flag. The speed flag is used to indicate that a speed of the terminal meets a preset condition. For example, the preset condition is that the speed of the terminal exceeds a speed threshold.

S303: The network device sends beam management information to the terminal, and the terminal receives the beam management information from the network device.

After receiving the moving state information of the terminal reported by the terminal, the network device determines, based on the speed flags in the moving state information of the terminal, that the speed of the terminal exceeds the speed threshold. In this case, a precise narrow beam is no longer appropriate for communication of the terminal in medium- and high-speed moving. The network device selects an appropriate beam management manner. For example, the network device performs scheduling by using a wide beam or a plurality of beams, to improve communication mobility performance.

The beam management information is used to switch a scheduling mode in a medium- and high-speed scenario for the beam corresponding to the terminal. Optionally, the beam management information may include but is not limited to:

information indicating to change a precise narrow beam into a wide beam, or change a precise narrow beam into a plurality of beams from a plurality of network devices; information about measurement reporting, reselection, and a handover threshold dedicated in a medium- and high-speed scenario; and information about a medium- and high-speed dedicated frequency or time resource.

The following further describes in detail an optional implementation of the embodiment shown in FIG. 3.

(1) Concept of the Moving State Information of the Terminal

The moving state information of the terminal has a plurality of representation forms, and may include one or a combination of the following parameters: information about a change of a location of the terminal relative to a serving cell, information about a change of a location of the terminal relative to a neighboring cell, the moving speed of the terminal, an altitude of the terminal, a moving direction of the terminal, or longitude and latitude of a location of the terminal.

The moving state information of the terminal reported by the terminal includes the speed flag. A value of the speed flag may include a first value and a second value, and the speed flag occupies one bit. For example, the speed flag is used to indicate that the speed of the terminal exceeds the speed threshold when the value of the speed flag is 1 and the speed flag is used to indicate that the speed of the terminal is lower than the speed threshold when the value of the speed flag is 0, and vice versa. When the terminal reports the moving state information of the terminal to the network device in the step S302, the speed flag is used to indicate that the speed of the terminal exceeds the speed threshold. Therefore, the network device may determine an appropriate beam management manner based on the speed flag.

(2) Occasion on Which the Terminal Reports the Moving State Information of the Terminal to the Network Device Manner 1: The terminal reports the moving state information of the terminal to the network device when the speed of the terminal reaches the speed threshold.

In Manner 1, when the speed of the terminal reaches the speed threshold, the terminal may report the moving state information of the terminal to the network device once in a specific time period. This can help reduce power consumption and save energy of the terminal. Alternatively, the terminal reports the moving state information of the terminal to the network device each time the speed of the terminal reaches the speed threshold. This can improve reporting precision and accuracy, and effectiveness of beam management.

Manner 2: The terminal reports the moving state information of the terminal to the network device when the speed of the terminal reaches the speed threshold and duration reaches a specified first time threshold.

In Manner 2, the speed of the terminal may abruptly reach the speed threshold without continuity. To avoid this case, after the speed of the terminal reaches the speed threshold, the terminal reports the moving state information of the terminal to the network device only when an average speed of the terminal can reach the speed threshold within specific duration. The specific duration is the first time threshold.

(3) Speed Threshold

The speed threshold may include one or more thresholds. For example, if the speed threshold is one threshold, in the solution described in (2), the terminal only needs to determine a reporting occasion based on the threshold.

The speed threshold may alternatively be a plurality of thresholds. In this case, the terminal may trigger a reporting occasion each time the speed of the terminal reaches a threshold. Optionally, Manner 1 or Manner 2 is used for the reporting.

For example, the speed threshold includes three thresholds: a first threshold, a second threshold, and a third threshold in ascending order. When the speed of the terminal reaches the first threshold, the terminal reports the moving state information of the terminal to the network device. Subsequent tracing and reporting are performed in an event triggering manner. An event includes each time of detecting that the speed reaches a threshold, including that the speed is increased to a high threshold and that the speed is decreased to a low threshold.

The speed threshold may be determined by the network device and notified to the terminal.

The first threshold is SpeedThreshold #1=L KM/H. Optionally, L=20 KM/H, which is converted into 5.6 m/s. An experiment shows that when the terminal moves at the speed L, performance is obviously degraded. Especially, a frequency offset of a millimeter wave is larger. The second threshold is SpeedThreshold #2=M KM/H. Optionally, M=60 KM/H. The third threshold is SpeedThreshold #3=N KM/H. Optionally M=100 KM/H.

(4) Manners for the Terminal to Report the Moving State Information of the Terminal to the Network Device Manner 1: The terminal reports the moving state information of the terminal at a physical layer.

For example, the terminal reports the moving state information of the terminal by using physical layer uplink control information (uplink control information, UCI). In this manner, a payload (payload) is limited, but real-time reporting is comparatively good. The manner is applicable to a scenario in which moving acceleration of the terminal is very high.

In a possible implementation in Manner 1, as shown in Table 1, an original physical uplink control (physical uplink control channel, PUCCH) format (format) includes 0 to 4. A newly added PUCCH format 5 may be used. Optionally, a format of the PUCCH format 5 is the same as the existing format 4. In other words, a length of an OFDM symbol is 4 to 14, and a quantity of occupied bits is greater than 2. However, the PUCCH format 5 is dedicated to reporting the moving state information of the terminal. When a PUCCH is reported, 4 to 14 orthogonal frequency division multiplexing (orthogonal frequency division multiplexing, OFDM) symbols symbols are occupied in time domain, and a minimum of 3 bits and a maximum of N bits are carried. Alternatively, the terminal reports the moving state information of the terminal by using a physical uplink shared channel (physical uplink shared channel, PUSCH). When a payload (payload) exceeds 100 bits, the terminal reports the moving state information of the terminal by using the PUSCH. The PUSCH may support reporting of a maximum of 500 bits.

TABLE 1

| PUCCH format | Length of an OFDM symbol | Quantity of bits |
| --- | --- | --- |
| 0 | 1 and 2 | ≤2 |
| 1 | 4 to 14 | ≤2 |
| 2 | 1 and 2 | >2 |

TABLE 1-continued

| PUCCH format | Length of an OFDM symbol | Quantity of bits |
|---|---|---|
| 3 | 4 to 14 | >2 |
| 4 | 4 to 14 | >2 |

Manner 2: The terminal reports the moving state information of the terminal by using a media access layer control unit (MAC control element, MAC CE).

In this manner, a payload and real-time reporting are balanced. The manner is applicable to any scenario.

A new MAC CE may be used, and an LCID may use a reserved number xx, for example, xx=33. For example, an example of encoding of the new MAC CE is shown in FIG. 4.

Manner 3: The terminal reports the moving state information of the terminal by using a radio resource control (RRC) message.

In this manner, a payload is heavy and real-time reporting is poor. The manner is applicable to a medium speed scenario where the moving state information of the terminal is accurately reported.

In a possible implementation of Manner 3, a terminal speed flag Uespeedflag sub-information element (information element, IE) may be newly added in terminal assistance information (UEAssistanceInformation). In addition, to save resources, it is considered to use any non-critical extension (nonCriticalExtension) message of uplink RRC, for example, an RRC reconfiguration complete (RRCreconfigurationComplete) message mentioned below, to report the moving state information of the terminal.

Manner #1: The terminal reports the moving state information of the terminal by using dedicated UEAssistanceInformation. A representation form is as follows.

---
User moving speed report (UE speedreport): A data structure is in a character string (SEQUENCE), for example, {
  high-speed moving flag (Highspeed flag),
  distance between the terminal and a serving cell of the terminal (DistanceServ)
  distance between the terminal and a neighboring cell of the terminal (DistanceNeighbour)
  ....
}
---

Manner #2: The terminal reports the moving state information of the terminal by using a nonCriticalextension field in any uplink RRC message. A representation form is as follows.

---
User moving speed report (UE speedreport): A data structure is in a character string (SEQUENCE), for example, {
  high-speed moving flag (Highspeed flag),
  distance between the terminal and a serving cell of the terminal (DistanceServ)
  distance between the terminal and a neighboring cell of the terminal (DistanceNeighbour)
  ....
}
---

(5) Capability Negotiation Between the Terminal and the Network Device

In this embodiment of this application, a capability that the terminal reports the moving state information of the terminal is a new capability. To ensure that a terminal that does not support the new capability and the network device can work normally, the terminal and the network device need to negotiate the capability in this application.

A specific negotiation process is as follows: The terminal sends a first capability information to the network device, and the network device receives the first capability information sent by the terminal. The first capability information is used to indicate that the terminal supports reporting of the moving state information of the terminal to the network device. In this way, the network device may obtain capability information of the terminal.

With reference to the description of (4), the first capability information of the terminal may be further classified into at least four capabilities: supporting only Manner 1, supporting only Manner 2, supporting only Manner 3, and supporting Manner 1 to Manner 3. Certainly, there may be more capabilities. Four capabilities are used as examples in this application.

The terminal may report the first capability information by using an uplink RRC message. For example, a terminal reports first capability information by using a non-critical extension (nonCriticalExtension) field in a (UE-NR-Capability) in a 5G capability reporting message. It is assumed that the terminal supports the foregoing four capabilities. A representation form of the field is as follows:

---
nonCriticalExtension: A data structure is in a character string
SEQUENCE {
  physical layer uplink control information reporting (UCI report),
  medium access layer control unit reporting (MAC CE report),
  radio resource management message reporting (RRC report), and
  the three reporting manners are supported. (ALL)
}
---

Examples of parameters used by the four capabilities may be as follows. Optionally, the network device may further actively deliver a command to request the terminal to stop reporting. Whether the terminal supports receiving of the command may also perform capability negotiation.

UEspeedreportByUCI( ): A data structure of an enumerated (enumerated) type (yes, no) is used to indicate that only a physical layer uplink control information UCI reporting can be supported.

UEspeedreportByMAC: A data structure of an enumerated enumerated type (yes, no) is used to indicate that only the medium access layer control unit MAC CE reporting can be supported.

UEspeedreportByRRC: A data structure of an enumerated enumerated type (yes, no) is used to indicate that only the radio resource management message RRC message reporting can be supported.

UEspeedreportByAll: A data structure of an enumerated enumerated type (yes, no) is used to indicate that the three reporting manners are supported.

Terminal moving speed report controlled and stopped by network device SpeedreportStopbyBS: A data structure of an enumerated enumerated type (yes, no) is used to indicate whether the terminal supports receiving a command that is actively delivered by the network device and that is used to stop reporting the moving state information of the terminal.

Likewise, the network device may also transfer capability information of the network device to the terminal. The network device sends second capability information to the terminal. The terminal receives the second capability information from the network device, and determines, based on the second capability information, that the network device supports receiving of the moving state information of the terminal reported by the terminal.

The network device may use a system message to carry the second capability information. For example, a network device uses a noncriticalExtension field in an SIB 1 to carry second capability information. The network device may further use nonCriticalExtension in any downlink RRC message to carry the second capability information.

Likewise, based on that the terminal has the foregoing four capabilities to support receiving of reporting of different protocol layers, the network device may also have corresponding four capabilities to receive reporting of the terminal at different layers.

Representation forms of fields of the four capabilities supported by network device are as follows:

```
nonCriticalExtension: SEQUENCE { UCI report,
MAC CE report,
RRC report, and
ALL
}
```

Examples of parameters used by the four capabilities may be as follows. Optionally, the network device may further actively deliver a command to request the terminal to stop reporting. Whether the network device supports sending of the command may also perform capability negotiation.

UEspeedreportByUCI: enumerated (yes, no) indicates that only receiving the reporting by using UCI is supported.

UEspeedreportByMAC: enumerated (yes, no) indicates that only receiving the reporting by using MAC is supported.

UEspeedreportByRRC: enumerated (yes, no) indicates that only receiving the reporting by using RRC is supported.

UEspeedreportByAll: enumerated (yes, no indicates that receiving the reporting in the three reporting manners is supported.

SpeedreportStopbyBS: enumerated (yes, no) indicates whether the network device supports the command that is actively delivered and that is used to stop reporting the moving state information of the terminal.

The network device actively notifies, based on an occasion of the network device, the terminal to stop measuring and reporting the moving state information of the terminal. The capability of the terminal is required to support receiving the command that is actively delivered by the network device and that is used to stop reporting the moving state information of the terminal. In other words, SpeedreportStopbyBS=Yes.

On the other hand, to avoid false alarm reporting caused by a transient high speed, the network device further notifies the terminal of reporting delay timing. The network device notifies the terminal of speed reporting delay (speedreport_delaytimer), that is, reporting time is delayed after the speed threshold is reached. Delay time is determined based on time when a vehicle accelerates to a specified speed threshold. A parameter representation form of the delay time may be:

SpeedReport_delaytimer indicates that when a speed measured by the terminal reaches the speed threshold, the timer is started. When the timer expires, an average value of speeds measured during a timer period (including the measurement before the timer is started) is reported to the network device. The terminal receives the delay time, and starts the timer based on the delay time after a measured speed reaches the speed threshold. After the tinier expires, an average value of speeds measured during the timer period (including the measurement before the timer is started) is reported to the network device.

Based on a threshold sent by the network device, the first threshold is SpeedThreshold #1=L KM/H. Optionally, L=20 KM/H, which is converted into 5.6 m/s. An experiment shows that when the terminal moves at the speed L, performance is obviously degraded. Especially, a frequency offset of a millimeter wave is larger. The second threshold is SpeedThreshold #2=M KM/H. Optionally, M=60 KM/H. The third threshold is SpeedThreshold #3=N KM/H. Optionally, N=100 KM/H.

Based on the threshold sent by the network device, in a scenario shown in Table 2, reporting delay time SpeedReport_delay of the timer is T1. T1 is determined based on an empirical value. For example, in an urban scenario, T1=3s. In a railway dedicated network scenario, T1=15s.

TABLE 3

| Means of communications | 60 KMPH acceleration time | 100 KMPH acceleration time |
| --- | --- | --- |
| Car | 5 s | 10 s |
| Sports car | 3 s | 5 s |
| High-speed railway | 75 s | 125 s |

It should be noted that values of the parameters in this embodiment of this application are merely examples, and any appropriate value that may be selected in actual application falls within the protection scope of this application.

(6) The Terminal Reports the Speed of the Terminal in an Explicit Manner and an Implicit Manner.

The moving state information of the terminal includes the speed flag. The moving state information further includes information such as the speed and a location of the terminal.

The speed flag may occupy 1 bit. However, the information about the speed of the terminal occupies a comparatively large quantity of bits. The foregoing three thresholds L, M, and N are still used as an example. L=20 KM/H, M=60 KM/H, and N=100 KM/H, to display bits that need to be occupied when a threshold by which a current speed that exceeds, for example, 9 bits.

Alternatively, the terminal may report the speed of the terminal in the implicit manner in the foregoing three manners Manner 1 to Manner 3 in which the terminal reports the moving state information. If both the terminal and the network device support reporting in the three manners, the terminal may establish correspondences between the three reporting manners and the three thresholds. For example, Manner 1 corresponds to the third threshold N, Manner 2 corresponds to the second threshold M, and Manner 3 corresponds to the first threshold L. When the terminal uses Manner 1 for reporting, it indicates that the current speed of the terminal reaches the third threshold N. When the terminal uses Manner 2 for reporting, it indicates that the current speed of the terminal reaches the second threshold M. When the terminal uses Manner 3 for reporting, it indicates that the current speed of the terminal reaches the first threshold L Speed values corresponding to the three thresholds may be preset. In this way, the speed value currently corresponding to the terminal may be determined based on a reporting manner. Therefore, displaying reporting of information about the speed can be avoided, and a quantity of bits occupied by the moving state information of the terminal is reduced. For example, 9 bits are reduced in the foregoing example.

(7) With Reference to the Descriptions of (1) to 6), the Moving State Information of the Terminal is Further Described in Detail.

The moving state information of the terminal includes one or more parameters. Table 3 lists types of specific parameters, types of reported data, occupied bits, processing manners, and necessity.

CE, or an RRC message. The parameter is converted according to 1 hPa=9 m, and supports a maximum value of altitude 1000 m. The highest altitude of a building is 632 m, and a maximum elevation of an unmanned aerial vehicle is 500 m. Float float values of the parameter moving direction of the terminal include an Azimuth (Z axis) angle, a Pitch (X axis) angle, and a Roll (Y axis) angle, and the parameter occupies

TABLE 4

| Reported parameter | Reported data | Parameter bit width (bit) | Processing manner | Necessity |
|---|---|---|---|---|
| Speed flag HighspeedFlag | Enumerated values: slow, fast | 1 | Report by using UCI, a MAC CE, or an RRC message | Necessary |
| Distance to a serving cell | Enumerated values: far, near | 9 | Estimate based on a TA value (a maximum resolution: 39 m) and support a maximum value of 512 m | Optional |
| Distance to a neighboring cell | Enumerated values: far, near | 9 | Estimate based on a TA value of a serving cell and a time difference between the neighboring cell and the serving cell and support a maximum value of 512 m | Optional |
| Moving speed | Integer ranging from 0 to 500 Km/h | 9 | Report by using UCI, a MAC CE, or an RRC message | Optional |
| Altitude | Integer ranging from 0 to 1000 m | 10 | Report by using UCI, a MAC CE, or an RRC message, convert according to 1 hPa = 9 m, and support a maximum value of altitude is 1000 m (The highest altitude of a building is 632 m, and a maximum elevation of an unmanned aerial vehicle is 500 m.) | Optional |
| Direction | Float values: Azimuth (Z axis), Pitch (X axis), and Roll (Y axis) | 96 | Report by using UCI, a MAC CE, or an RRC message, and provide angles on three axes: Azimuth (Z axis), Pitch (X axis), and Roll (Y axis) | Optional |
| Latitude and Longitude | Double precision: four to five decimal points | 64 | Report by using UCI, a MAC CE, or an RRC message | Optional |

As shown in FIG. 4, the moving state information of the terminal includes the one or more parameters. The speed flag is necessary, and other parameters are optional. In other words, the moving state information reported by the terminal to the network device includes the speed flag, and optionally, may also include the other parameters.

For example, enumerated values of the speed flag include fast and slow, and the speed flag occupies 1 bit. The parameter may be reported by using UCI, a MAC CE, or an RRC message. Enumerated values of the parameter distance to a serving cell include far and near, and the parameter occupies 9 bits. The parameter can be estimated based on a TA value. A maximum resolution is 39 m. A maximum value of 512 m is supported. Enumerated values of the parameter distance to a neighboring cell include far and near, and the parameter occupies 9 bits. The parameter is estimated based on a TA value of a serving cell and a time difference between the neighboring cell and the serving cell. A maximum value of 512 in is supported. A value of the parameter moving speed of the terminal is an integer, for example, ranging from 0 to 500 Km/h, and the parameter occupies 9 bits. The parameter may be reported by using UCI, a MAC CE, or an RRC message. A value of the parameter altitude of the terminal is an integer, for example, ranging from 0 to 1000 m, and the parameter may be reported by using UCI, a MAC CE, or an RRC message. The parameter is converted according to 1 hPa=9 m, and supports a maximum value of altitude 1000 m. The highest altitude of a building is 632 m, and a maximum elevation of an unmanned aerial vehicle is 500 m. Float float values of the parameter moving direction of the terminal include an Azimuth (Z axis) angle, a Pitch (X axis) angle, and a Roll (Y axis) angle, and the parameter occupies 96 bits. The parameter can be reported by using UCI, a MAC CE, or an RRC message, and angular velocity on the three axes can be reported. The parameter longitude and latitude of the terminal is a double precision type, and is accurate to four to five decimal points. The parameter can be reported by using UCI, a MAC CE, or an RRC message.

(8) Manners of Measuring the Moving State Information by the Terminal

In this application, the terminal may obtain the moving state information of the terminal by using a sensor. The terminal may further obtain the moving state information of the terminal by measuring a frequency offset by using a baseband processor. Alternatively, the terminal may obtain the moving state information of the terminal with reference to a measurement result of a sensor and a measurement result obtained from a baseband processor by measuring a frequency offset. The manner in which the baseband processor measures the frequency offset is specifically that an automatic frequency control (automatic frequency control, AFC) module in the baseband processor measures a Doppler shift, and then convert an obtained carrier frequency into a speed.

Precision of measuring the moving state information of the terminal by using the sensor is comparatively high. In this application, the baseband processor may be calibrated based on a first measurement result obtained by the sensor and a second measurement result obtained by the baseband processor. This helps improve measurement accuracy of the baseband processor.

The following provides an example in which a sensor measures moving state information of a terminal, as shown in Table 4.

TABLE 5

| Sensor | Function | Unit | Application scenario | Reported data processing | Reported data format (bit) |
|---|---|---|---|---|---|
| Acceleration sensor (ACCELEROMETER) | Measure acceleration on X, Y, and Z axes | m/s$^2$ | Driving/High-speed railway | Obtain a speed Km/h through integral conversion | 9 (support 500 Km/h) |
| Barometer gauge (PRESSURE) | Measure atmospheric pressure information to convert into a height | hPa (hpascal) | Unmanned aerial vehicle/Elevator | Convert according to 1 hPa = 9 m | 10 (support 1024 m) |
| Direction sensor (Orientation) | Measure directions on three axes | Angle | A network device accurately learns location scheduling of a terminal | Report rotation angles of the three axes separately | 32 (float type) |
| GPS, BeiDou, and GLONASS | Measure latitude and longitude | Degree, minute, and second | A network device accurately learns location scheduling of a terminal | Accurate to four or five decimal points (10 m- or 1 m-level accuracy) | 64 (double type) |

As shown in Table 4, types of sensors include an acceleration sensor, a barometer gauge, a direction sensor, a global positioning system (global positioning system, GPS), BeiDou, and a global navigation satellite system GLONASS. The acceleration sensor may measure acceleration on three axes, that is, acceleration of the terminal on an X axis, a Y axis, and a Z axis. A unit of a measured value is m/s$^2$. An application scenario is driving or high-speed railway. A speed Km/h is obtained through integral conversion. Reported data occupies 9 bits. 500 Km/h is supported. The barometer gauge is used to measure atmospheric pressure information. A unit of the atmospheric pressure information is hpascal (hPa). The barometer gauge can be used in scenarios such as an unmanned aerial vehicle and an elevator. The atmospheric pressure information can be converted into a height according to 1 hPa=9 m. Reported data occupies 9 bits. 1024 m may be supported. The direction sensor is used to measure directions on three axes. A unit is an angle. The direction sensor is used in a scenario where a network device accurately learns location scheduling of a terminal. Rotation angles of the three axes can be reported separately. Reported data occupies 9 bits and is of a float type. The GPS, the BeiDou, and the GLONASS can be used to measure longitude and latitude of a terminal. A unit is degree, minute, and second. The GPS, the BeiDou, and the GLONASS can be used in a scenario where a network device accurately learns location scheduling of a terminal. A measurement value is accurate to four or five decimal points, that is, 10 m- or 1 m-level accuracy. Data occupies 64 bits and is of a double type.

It may be understood that attributes of various parameters in Table 3 and Table 4 are merely examples, and in actual application, various variations may be performed on the attributes of the parameters.

In a possible implementation, after the terminal is powered on, when a moving speed reaches a speed threshold (herein, if there are a plurality of speed thresholds, the speed threshold is the lowest speed threshold) for the first time, the moving state information of the terminal is obtained by using the sensor, so that accurate measurement and reporting can be implemented. In a subsequent moving process of the terminal, the terminal needs to track and measure a moving state of the terminal. An energy saving manner may be selected for the tracking and measuring. In other words, the moving state information of the terminal is obtained only by measuring the frequency offset by using the baseband processor. When a speed of the terminal reaches a speed threshold again, for example, there are a plurality of thresholds, and the speed of the terminal reaches a comparatively high threshold or decreases to a lower threshold, the terminal obtains the moving state information of the terminal by using only the sensor, to obtain accurate data.

Certainly, the terminal may alternatively always obtain the moving state information of the terminal by using the sensor to perform the tracking and the measuring and implement high-precision measurement and reporting. Alternatively, the terminal may always perform the tracking and the measuring by using both the sensor and the baseband processor. This manner is applicable to, for example, an application scenario of an unmanned aerial vehicle terminal in which a height changes greatly.

When the terminal measures the moving state information of the terminal by using the sensor, accurate tracking and measuring can be implemented.

So far, descriptions of the optional implementations of the embodiment shown in FIG. 3 are completed.

In the step S303 of the process shown in FIG. 3, after receiving the moving state information of the terminal reported by the terminal, the network device determines, based on the speed flag in the moving state information of the terminal, that the speed of the terminal exceeds the speed threshold. Therefore, the network device selects the appropriate beam management manner. A scheduling mode in a medium- and high-speed scenario is performed on a beam and/or a link of the terminal, in a possible implementation, after the step S303 the terminal may further exit the scheduling mode in the medium- and high-speed scenario.

Optionally, the terminal may actively report to exit the scheduling mode in the medium- and high-speed scenario. The terminal reports indication information to the network device when determining that the moving speed of the terminal is lower than a low-speed threshold. The indication information is used to indicate that the speed of the terminal is lower than the low-speed threshold. The terminal reports the indication information to the network device when the moving speed of the terminal is lower than the low-speed threshold and duration reaches a specified second time threshold. The low-speed threshold is the speed threshold, or when the speed thresholds have a plurality of thresholds, the low-speed threshold is the lowest value of the plurality of thresholds of the speed thresholds.

The indication information may be the speed flag highspeedflag, and a value of the speed flag is 0. The indication information is used to indicate that the speed of the terminal is lower than the low-speed threshold.

Specifically, when the terminal detects that the moving speed is lower than the speed threshold, if the speed thresholds include a plurality of values, the moving speed herein refers to the lowest value, for example, a SpeedThreshold #1, of the plurality of thresholds. Alternatively, the terminal detects that the moving speed is lower than the speed threshold for a period of time, and reports, to the network device, uplink control information or a message including only highspeedflag=0. After receiving the uplink control information or message, the network device may exit the scheduling mode in the medium- and high-speed scenario, and restore a slow precise narrow beam management manner. After receiving an acknowledgment that is sent by the network device and that indicates the moving state information has been received, the terminal stops reporting the moving state information, and stops monitoring behavior of the sensor. Optionally, a default value of the low-speed threshold is 3 s.

As described in (5) capability negotiation, the network device has the capability of actively delivering the command to require that the terminal stops reporting, and the terminal may have the capability of receiving the command actively delivered by the network device to require that the terminal stops reporting.

When determining that the speed of the terminal is lower than the low-speed threshold SpeedThreshold #1 based on the latest moving state information reported by the terminal or a speed converted from the Doppler shift measured by the network device in uplink, the network device delivers the command to require that the terminal stops reporting.

If a speed result measured by the network device is different from a result reported by the terminal, the network device may enable the terminal to continue reporting for a period of time Tspeedguard. For example, Tspeedguard is 5 s. When Tspeedguard expires, the moving state information reported by the terminal indicates that the terminal changes to slow moving. The network device directly exits the scheduling mode in the medium- and high-speed scenario. If the moving state information reported by the terminal still indicates that the terminal is in medium- and high-speed moving, and the moving state information is inconsistent with a speed estimated by the network device, the network device determines whether to continue to exit the scheduling mode in the medium- and high-speed scenario.

Based on the descriptions of the foregoing embodiment, in a possible implementation of this application, a terminal may periodically report moving state information of the terminal to a network device. The moving state information does not include a speed flag, and may include parameters such as information about a change of a location of the terminal relative to a serving cell, information about a change of a location of the terminal relative to a neighboring cell, a moving speed of the terminal, an altitude of the terminal, a moving direction of the terminal, or longitude and latitude of a location of the terminal. For differentiation, the moving state information in the embodiment shown in FIG. 3 is denoted as first moving state information, and the periodically reported moving state information is denoted as second moving state information. The network device determines, based on the received moving state information, whether to change to the scheduling mode in the medium- and high-speed scenario or the precise narrow beam mode.

Figure 5:
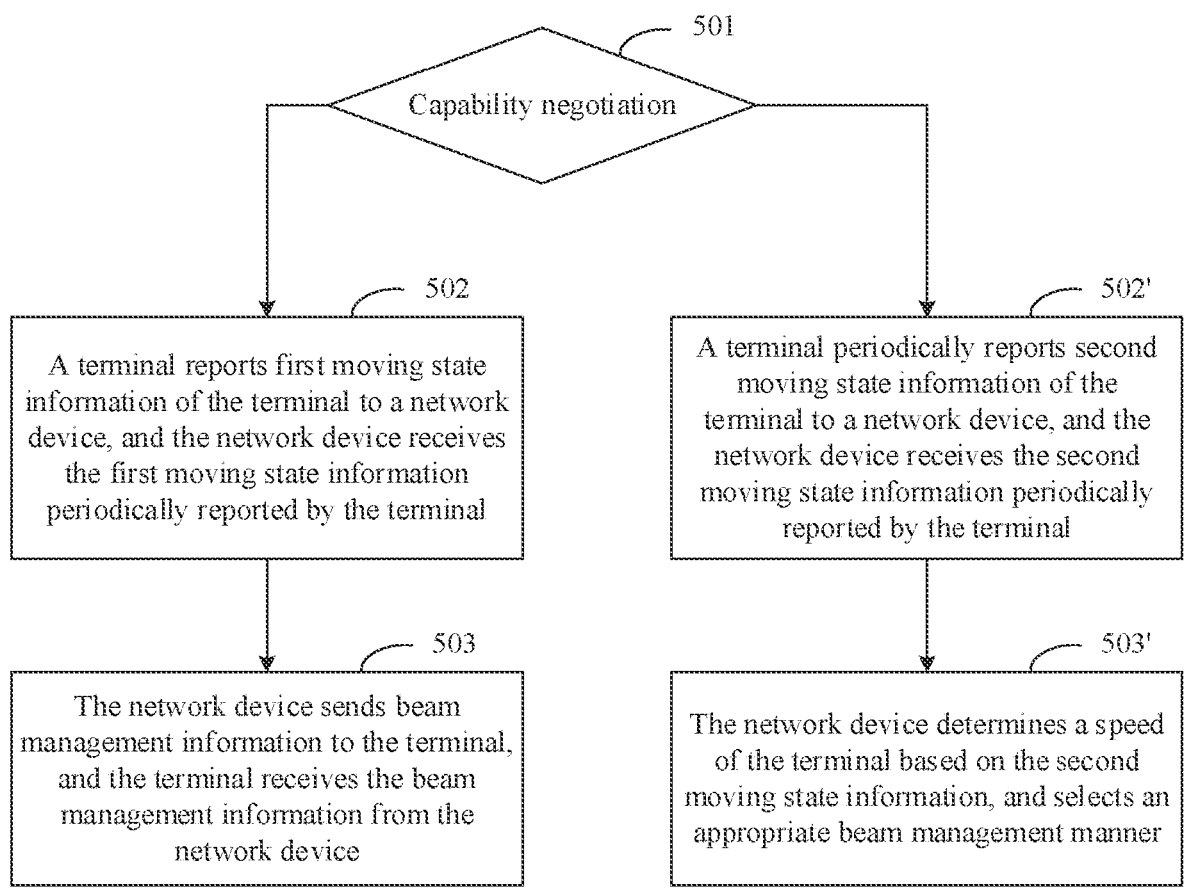
FIG. 5 is a schematic flowchart of a beam management method according to an embodiment of this application.

Based on a same concept as the foregoing moving state reporting method, as shown in FIG. 5, an embodiment of this application provides a beam management method. Specific steps are as follows.

S501: A terminal negotiates capabilities with a network device.

The capabilities negotiated between the terminal and the network device include a capability 1 and a capability 2. The capability 1 is the capability of supporting reporting or receiving the moving state information of the terminal, described in (5). The moving state information herein, namely, first moving state information, includes a speed flag. The capability 2 is a capability of supporting periodically reporting or receiving moving state information of the terminal. The moving state information herein, namely, second moving state information, does not include a speed flag.

The terminal may support only the capability 1, support only the capability 2, or support both capabilities. Likewise, the network device may support only the capability 1, support only the capability 2, or support both capabilities. The terminal and the network device determine, through the capability negotiation, a capability supported by both the terminal and the network device. The terminal and the network device select a reporting manner based on the supported capability.

When both the terminal and the network device support the capability 1, a step S502 may be performed. When both the terminal and the network device support the capability 2, a step S502' may be performed.

The step S502 is the same as the step S302. No repeated description is provided.

A step S503 is the same as the step S303. No repeated description is provided.

S502': The terminal periodically reports the second moving state information of the terminal to the network device, and the network device receives the second moving state information periodically reported by the terminal.

S502': The network device determines a speed of the terminal based on the second moving state information, and selects an appropriate beam management manner.

Specifically, when the network device determines, based on the second moving state information, that the terminal is in a medium- and high-speed moving scenario, a scheduling mode in the medium- and high-speed scenario may be used. When the network device determines, based on the second moving state information, that the terminal is in a low-speed moving scenario, a precise narrow beam scheduling mode may be used.

Based on a same concept as the foregoing method embodiments, on a basis that the terminal has a function of a newly added sensor, for example, a newly added hygrometer and thermometer, the moving state information reporting method may be further extended in this application as follows: reporting information such as rain attenuation or snow attenuation to a network device based on a sensor similar to the hygrometer and the thermometer, so that the network device performs communication management optimization, for example, beam management optimization, based on the information.

Figure 6:
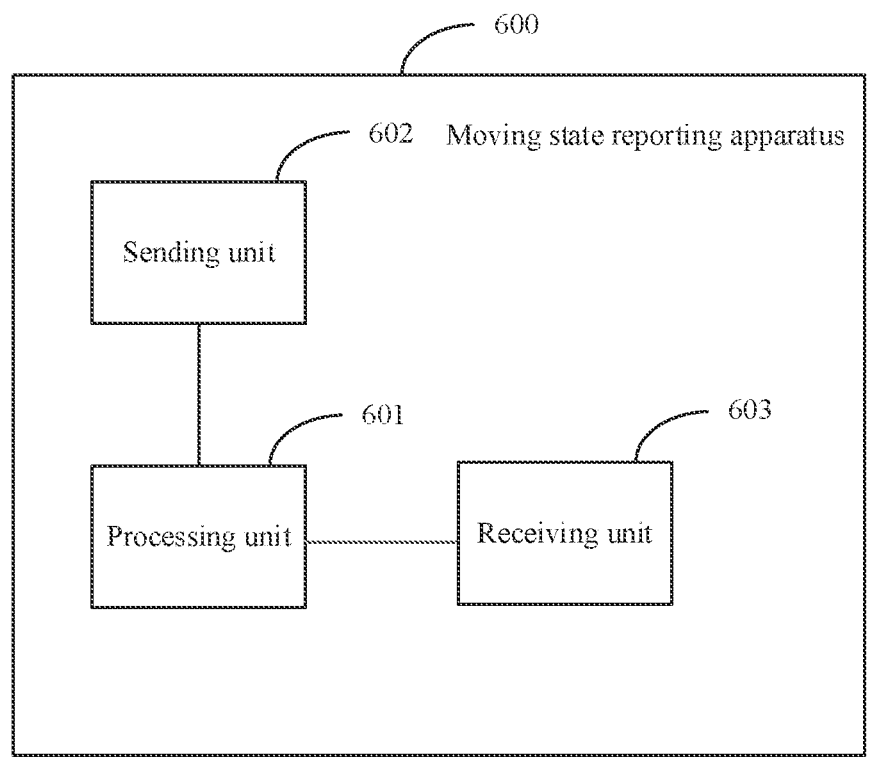
FIG. 6 is a schematic diagram 1 of a structure of a moving state reporting apparatus according to an embodiment of this application.

Based on a same inventive concept as the foregoing method embodiments, as shown in FIG. 6, an embodiment of this application further provides a moving state reporting apparatus 600. The moving state reporting apparatus 600 includes a processing unit 601, a sending unit 602, and a receiving unit 603. In an embodiment, the processing unit 601 is configured to communicate with a network device by using a beam to carry a signal. The sending unit 602 is configured to report moving state information of the terminal to the network device. The moving state information of the terminal includes a speed flag. The speed flag is used to indicate that a speed of the terminal exceeds a speed threshold. The receiving unit 603 is configured to receive beam management information from the network device. In another embodiment, the processing unit 601 is configured to communicate with a network device by using a beam to carry a signal. The sending unit 602 is configured to periodically report moving state information (the second moving state information described in the method embodiment) of the terminal to the network device. The receiving unit 603 is configured to receive beam management information from the network device.

The processing unit 601 is further configured to perform another operation, other than operations of signal receiving and sending, performed by the terminal described in the foregoing method embodiments. The sending unit 602 and the receiving unit 603 are further configured to perform some detailed operations performed by the terminal described in the method embodiments. No repeated description is provided.

Figure 7:
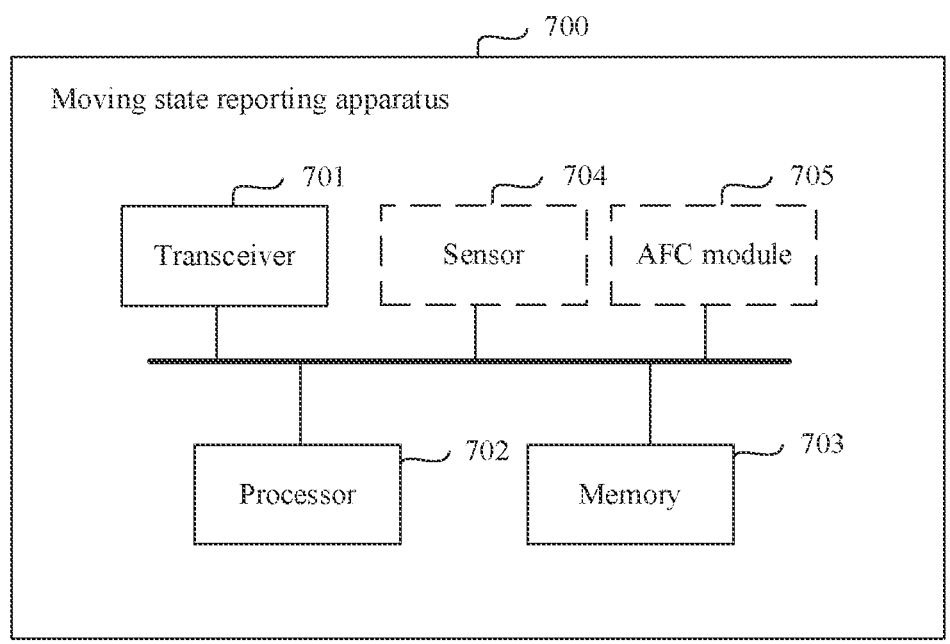
FIG. 7 is a schematic diagram 2 of a structure of a moving state reporting apparatus according to an embodiment of this application.

Based on a same inventive concept as the foregoing method embodiments, as shown in FIG. 7, an embodiment of this application further provides a moving state reporting apparatus 700. The moving state reporting apparatus 700 includes a transceiver 701, a processor 702, and a memory 703. The memory 703 is optional. The memory 703 is configured to store a program executed by the processor 702. When the moving state reporting apparatus 700 is configured to implement an operation performed by the terminal in the foregoing method embodiments, the processor 702 is configured to invoke a group of programs. When the programs are executed, the processor 702 is enabled to perform the operations performed by the terminal in the foregoing method embodiments. Function modules in FIG. 6, namely, the sending unit 602 and the receiving unit 603, may be implemented by using the transceiver 801, and the processing unit 601 may be implemented by using the processor 702. Optionally, the moving state reporting apparatus 700 further includes a sensor 704 and an AFC module 705. The sensor 704 is configured to obtain moving state information of the terminal. The AFC module 705 is configured to obtain the moving state information of the terminal by measuring a frequency offset. The AFC module 705 is located in a baseband processor, and is configured to measure a Doppler shift. An obtained carrier frequency is converted into a speed.

The processor 702 may be a central processing unit (central processing unit, CPU), a network processor (network processor, NP), or a combination of a CPU and an NP.

The processor 702 may further include a hardware chip. The hardware chip may be an application-specific integrated circuit (application-specific integrated circuit, ASIC), programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof.

The memory 703 may include a volatile memory (volatile memory), such as a random access memory (random-access memory, RAM). Alternatively, the memory 703 may include a non-volatile memory (non-volatile memory), such as a flash memory (flash memory), a hard disk drive (hard disk drive, HDD), or a solid-state drive (solid-state drive, SSD). Alternatively, the memory 703 may include a combination of the foregoing types of memories.

In the moving state method provided in the foregoing embodiments of this application, some or all of the operations and functions performed by the terminal may be completed by using a chip or an integrated circuit.

To implement functions of the apparatus described in FIG. 6 or FIG. 7, an embodiment of this application further provides a chip including a processor, configured to support the apparatus in implementing the functions in the terminal provided in the method embodiments provided in the foregoing embodiments. In a possible design, the chip is connected to a memory or the chip includes a memory. The memory is configured to store a program instruction and data that are necessary for the apparatus.

An embodiment of this application provides a computer storage medium. The computer storage medium store a computer program, and the computer program include an instruction used to perform the method embodiments provided in the foregoing embodiments.

An embodiment of this application provides a computer program product including an instruction. When the computer program product runs on a computer, the computer is enabled to perform the method embodiments provided in the foregoing embodiments.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media, (including but not limited to a disk memory, a CD-ROM, an optical memory, and the like) that include computer usable program code.

This application is described with reference to the flowcharts and/or block diagrams of the method, the device system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of this application have been described, a person skilled in the art can make changes and modifications to these embodiments once learning the basic inventive concept. Therefore, the following claims are intended to be construed as to cover the preferred embodiments and all changes and modifications falling within the scope of this application.

Obviously, a person skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. A method implemented by a terminal, wherein the method comprises:
   communicating with a network device using a beam to carry a signal;
   obtaining moving state information of the terminal, wherein the moving state information comprises a speed flag indicating a relationship between a speed of the terminal and a speed threshold, and wherein obtaining the moving state information comprises:
      using a sensor when determining to meet an accurate measurement for reporting; and
      measuring a frequency offset using a baseband processor when determining to obtain the moving state information in an energy saving manner, wherein the frequency offset is a Doppler shift;
   reporting the moving state information to the network device when the speed meets a preset condition, wherein the preset condition comprises one of the speed reaching the speed threshold, the speed reaching the speed threshold and a first duration reaching a first time threshold, or an average speed of the terminal reaching the speed threshold during a preset duration; and
   receiving, from the network device based on the moving state information, beam management information.

2. The method of claim 1, further comprising obtaining the moving state information of the terminal by:
   measuring a moving state of the terminal using the sensor to obtain a first measurement result;
   measuring the moving state of the terminal using the baseband processor to obtain a second measurement result; and
   calibrating the baseband processor based on the first measurement result and the second measurement result.

3. The method of claim 1, further comprising reporting the moving state information to the network device using one of uplink control information, a media access layer control unit, or a Radio Resource Control message.

4. The method of claim 1, further comprising:
   sending, to the network device, first capability information indicating that the terminal supports reporting of the moving state information to the network device; or
   receiving, from the network device, second capability information, and determining, based on the second capability information, that the network device supports receiving of the moving state information from the terminal.

5. The method of claim 4, wherein the second capability information is in a system message.

6. The method of claim 4, wherein the first capability information is in an uplink Radio Resource Control (RRC) message.

7. The method of claim 1, wherein the preset condition further comprises the speed being lower than a low-speed threshold.

8. The method of claim 1, further comprising:
   reporting, to the network device, indication information when the speed is lower than a low-speed threshold;
   reporting, to the network device, the indication information when the speed is lower than the low-speed threshold and a second duration reaches a second time threshold; or
   reporting, to the network device, the moving state information when the average speed is lower than the speed threshold during the preset duration, wherein the low-speed threshold is either the speed threshold or a lowest value in speed thresholds.

9. The method of claim 8, wherein the indication information comprises a high-speed flag, and wherein the high-speed flag is a second value.

10. The method of claim 9, further comprising communicating with the network device using a precise narrow beam to carry the signal when the speed is lower than the low-speed threshold.

11. The method of claim 8, wherein the indication information comprises a high-speed flag, and wherein the high-speed flag is a first value.

12. The method of claim 1, wherein the moving state information further comprises:
   first information about a first change of a first location of the terminal relative to a serving cell;
   second information about a second change of a second location of the terminal relative to a neighboring cell;
   the speed of the terminal;
   an altitude of the terminal;
   a moving direction of the terminal; or
   a longitude and a latitude of a third location of the terminal.

13. The method of claim 1, wherein the beam management information comprises:
   first information indicating to change a precise narrow beam either into a wide beam or into a plurality of beams from a plurality of network devices;
   second information about measurement reporting, reselection, and a handover threshold dedicated in a medium-speed and high-speed scenario; or third information about a medium-speed and high-speed dedicated frequency or time resource.

14. A method implemented by a terminal, wherein the method comprises:
communicating with a network device using a beam to carry a signal;
obtaining moving state information of the terminal, wherein the moving state information comprises a speed flag indicating a relationship between a speed of the terminal and a speed threshold that meets a preset condition, and wherein obtaining the moving state information comprises:
using a sensor when determining to meet an accurate measurement for reporting; and
measuring a frequency offset using a baseband processor when determining to obtain the moving state information in an energy saving manner, wherein the frequency offset is a Doppler shift;
periodically reporting the moving state information to the network device; and
receiving beam management information from the network device based on the moving state information.

15. The method of claim 14, wherein the moving state information further comprises:
first information about a first change of a first location of the terminal relative to a serving cell;
second information about a second change of a second location of the terminal relative to a neighboring cell;
a moving speed of the terminal;
an altitude of the terminal;
a moving direction of the terminal; or
a longitude and a latitude of a third location of the terminal.

16. The method of claim 14, further comprising:
sending, to the network device, first capability information indicating that the terminal supports periodically reporting of the moving state information to the network device; or
receiving, from the network device, second capability information and determining, based on the second capability information, that the network device supports periodically receiving of the moving state information from the terminal.

17. A communications device comprising:
a memory configured to store instructions; and
a processor coupled to the memory, wherein the instructions cause the processor to be configured to:
communicate with a network device using a beam to carry a signal;
obtain moving state information of the terminal, wherein the moving state information comprises a speed flag indicating a relationship between a speed of the terminal and a speed threshold, and wherein obtaining the state information comprises:
using a sensor when determining to meet an accurate measurement for reporting; and
measuring a frequency offset using a baseband processor when determining to obtain the moving state information in an energy saving manner, wherein the frequency offset is a Doppler shift;
reporting the moving state information to the network device when the speed meets a preset condition, wherein the preset condition comprises one of the speed reaching the speed threshold, the speed reaching the speed threshold and a duration reaching a first time threshold, or an average speed of the terminal reaching the speed threshold during a preset duration; and
receiving beam management information from the network device based on the moving state information.

18. The communications device of claim 17, wherein the instructions further cause the processor to be configured to:
measure a moving state of the terminal using the sensor to obtain a first measurement result;
measure the moving state using the baseband processor to obtain a second measurement result; and
calibrate the baseband processor based on the first measurement result and the second measurement result.

19. The communications device of claim 17, wherein when the instructions further cause the processor to be configured to report the moving state information using one of uplink control information, a media access layer control unit, or a Radio Resource Control (RRC) message.

20. The communications device of claim 17, wherein the instructions further cause the processor to be configured to:
send, to the network device, wherein the first capability information indicating that the terminal supports reporting of the moving state information; or
receive, from the network device, second capability information and determine, based on the second capability information, that the network device supports receiving of the moving state information from the terminal.

* * * * *